US012776048B2

(12) United States Patent
Jung et al.

(10) Patent No.: US 12,776,048 B2
(45) Date of Patent: Oct. 27, 2026

(54) ELECTRONIC APPARATUS FOR OBTAINING CONTACT INFORMATION FOR AN OBJECT BY DISPLACEMENT OF MARKERS ON CONTACT PORTION AND CONTROL METHOD THEREOF

(71) Applicant: SAMSUNG ELECTRONICS CO., LTD., Suwon-si (KR)

(72) Inventors: Daehwan Jung, Suwon-si (KR); Sahnggyu Park, Suwon-si (KR); Hyunseok Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 481 days.

(21) Appl. No.: 18/242,372

(22) Filed: Sep. 5, 2023

(65) Prior Publication Data

US 2024/0161311 A1 May 16, 2024

Related U.S. Application Data

(63) Continuation of application No. PCT/KR2023/011853, filed on Aug. 10, 2023.

(30) Foreign Application Priority Data

Nov. 11, 2022 (KR) ........................ 10-2022-0150485

(51) Int. Cl.
*G06T 7/246* (2017.01)
*B25J 9/16* (2006.01)
*G06T 7/60* (2017.01)

(52) U.S. Cl.
CPC ............. *G06T 7/248* (2017.01); *B25J 9/1697* (2013.01); *G06T 7/60* (2013.01); *G06T 2207/10024* (2013.01); *G06T 2207/30204* (2013.01)

(58) Field of Classification Search
CPC . G06T 7/248; G06T 7/60; G06T 2207/10024; G06T 2207/30204; B25J 9/1697
See application file for complete search history.

(56) References Cited

U.S. PATENT DOCUMENTS 6,909,084 B2 6/2005 Tachi et al.
7,420,155 B2 9/2008 Mizota et al.
(Continued)

FOREIGN PATENT DOCUMENTS

JP 2008-197078 A 8/2008
JP 2019-171569 A 10/2019
(Continued)

OTHER PUBLICATIONS

"GelSight Mini", gelsight, Sep. 7, 2022. (3 pages total).
Communication dated Oct. 21, 2025, issued by the European Patent Office in European Patent Application No. 23888870.5.

*Primary Examiner* — Matthew C Bella
*Assistant Examiner* — Jinsu Hwang
(74) *Attorney, Agent, or Firm* — Sughrue Mion, PLLC

(57) ABSTRACT

An electronic apparatus includes a contact portion including a plurality of markers, a camera, and at least one processor configured to identify, based on at least one surface of the contact portion contacting an object, at least one displacement of the plurality of markers based on a first image in which a first surface of the contact portion that is opposite to the at least one surface is captured by the camera, and identify, based on the at least one displacement, at least one of an intensity of a force applied to the contact portion and a direction of the force applied to the contact portion, where a first marker of the plurality of markers includes at least one of a form and a color that is different from a second marker of the plurality of markers that is adjacent to the first marker.

16 Claims, 15 Drawing Sheets

(56) References Cited

U.S. PATENT DOCUMENTS

| | | | | |
|---|---|---|---|---|
| 7,460,964 | B2 | 12/2008 | Mizota et al. | |
| 7,569,502 | B2 * | 8/2009 | Olsen | H10D 64/0134 438/786 |
| 7,659,502 | B2 * | 2/2010 | Tachi | G01L 5/228 250/221 |
| 7,707,001 | B2 | 4/2010 | Obinata et al. | |
| 11,137,297 | B2 | 10/2021 | Sawada et al. | |
| 2003/0178556 | A1 | 9/2003 | Tachi et al. | |
| 2008/0027582 | A1 | 1/2008 | Obinata et al. | |
| 2008/0245955 | A1 | 10/2008 | Tachi et al. | |
| 2009/0315989 | A1 | 12/2009 | Adelson | |
| 2024/0362801 | A1 * | 10/2024 | Hong | G01L 1/247 |

FOREIGN PATENT DOCUMENTS

| | | | | |
|---|---|---|---|---|
| JP | 2022-33634 | A | 3/2022 | |
| KR | 10-2003-0040398 | A | 5/2003 | |
| KR | 10-2006-0076292 | A | 7/2006 | |
| KR | 10-2006-0076293 | A | 7/2006 | |
| KR | 10-2007-0036015 | A | 4/2007 | |
| KR | 10-0846305 | B1 | 7/2008 | |
| KR | 10-2400965 | B1 | 5/2022 | |
| KR | 10-2023-0096431 | A | 6/2023 | |
| KR | 10-2710648 | B1 | 9/2024 | |
| WO | 02/18893 | A1 | 3/2002 | |
| WO | 2005/029028 | A1 | 3/2005 | |
| WO | 2005/085785 | A1 | 9/2005 | |
| WO | 2005/124305 | A1 | 12/2005 | |
| WO | WO-2020128430 | A1 * | 6/2020 | G01L 1/24 |
| WO | 2021/070967 | A1 | 4/2021 | |
| WO | 2021/070968 | A1 | 4/2021 | |
| WO | 2023/121355 | A1 | 6/2023 | |

* cited by examiner

ELECTRONIC APPARATUS FOR OBTAINING CONTACT INFORMATION FOR AN OBJECT BY DISPLACEMENT OF MARKERS ON CONTACT PORTION AND CONTROL METHOD THEREOF

CROSS-REFERENCE TO RELATED APPLICATIONS

This application is a continuation of International Application No. PCT/KR2023/011853, filed on Aug. 10, 2023, at the Korean Intellectual Property Receiving Office, which is based on and claims priority to Korean Patent Application No. 10-2022-0150485, filed on Nov. 11, 2022, in the Korean Intellectual Property Office, the disclosures of which are incorporated by reference herein in their entireties.

BACKGROUND

1. Field

The disclosure relates to an electronic apparatus and a control method thereof, and more particularly, to an electronic apparatus for obtaining contact information related to an object and a control method thereof.

2. Description of Related Art

With developments in electronic technology, electronic apparatuses of various types are being developed. Recently, robots with forms and functionality similar to a person are being developed.

SUMMARY

Provided are an electronic apparatus for improving sensing performance of contact information of a robot hand and a control method thereof Additional aspects will be set forth in part in the description which follows and, in part, will be apparent from the description, or may be learned by practice of the presented embodiments.

According to an aspect of the disclosure, an electronic apparatus may include a contact portion including a plurality of markers, a camera, and at least one processor configured to identify, based on at least one surface of the contact portion contacting an object, at least one displacement of the plurality of markers based on a first image in which a first surface of the contact portion that is opposite to the at least one surface is captured by the camera, and identify, based on the at least one displacement, at least one of an intensity of a force applied to the contact portion and a direction of the force applied to the contact portion, where a first marker of the plurality of markers may include at least one of a form and a color that is different from a second marker of the plurality of markers that is adjacent to the first marker.

Each of the plurality of markers may include at least one first pattern of a first form and at least one second pattern of a second form that is provided at one side of the at least one first pattern, and the at least one processor may be further configured to identify at least one of the intensity of the force and the direction of the force based on the at least one first pattern the at least one second pattern.

The first form may include a circular pattern and the second form may include a linear pattern.

The at least one processor may be further configured to identify a rotational force that is parallel to the contact portion based on displacement of the linear pattern.

The at least one second pattern may include a plurality of second patterns, and adjacent patterns of the plurality of second patterns may vary in color.

The first marker may include a circular first pattern and a linear first pattern oriented from the circular first pattern toward a first direction, the second marker may be adjacent to the first marker in a direction that is opposite the first direction, the second marker including a circular second pattern and a linear second pattern oriented from the circular second pattern toward a second direction that is perpendicular to the first direction, the plurality of markers may include a third marker and a fourth marker, the third marker may be adjacent to the second marker in a direction that is opposite the second direction, the third marker including a circular third pattern and a linear third pattern oriented from the circular third pattern toward a third direction that is perpendicular to the second direction, and the fourth marker may be adjacent to the third marker in direction that is opposite to the third direction, the fourth marker including a circular fourth pattern and a linear fourth pattern oriented from the circular fourth pattern toward a fourth direction that is perpendicular to the third direction.

The electronic apparatus may include a lens array provided at an opposite surface of the contact portion, the lens array including a plurality of lenses respectively corresponding to the plurality of markers, where the at least one processor may be further configured to identify a size change of each of the plurality of markers through each of the plurality of lenses and identify a force in a direction perpendicular to the contact portion based on the identified size change.

Each of the plurality of markers may include a first pattern of a first form or a first pattern of the first form and at least one second pattern of a second form adjacent to the first pattern of the first form.

The electronic apparatus may include a memory configured to store a second image in which a surface of the contact portion is captured through the camera prior to the contact portion contacting the object, and the at least one processor may be further configured to identify the at least one displacement based on the first image and the second image.

The contact portion may include a transparent gel and a coating layer formed at an upper end of the plurality of markers, and the plurality of markers may be provided at one surface of the transparent gel.

According to an aspect of the disclosure, a control method of an electronic apparatus, includes contacting at least one surface of a contact portion of the electronic apparatus to an object, identifying, based on a first image in which a first surface of the contact portion that is opposite to the at least one surface is captured by a camera of the electronic apparatus, at least one displacement of a plurality of markers provided in the contact portion and identifying, based on the identified at least one displacement, at least one an intensity of a force applied to the contact portion or a direction of the force applied to the contact portion, where a first marker of the plurality of markers may include at least one of a form and a color that is different from a second marker of the plurality of markers that is adjacent to the first marker.

Each of the plurality of markers may include at least one first pattern of a first form and at least one second pattern of a second form provided at one side of the at least one first pattern of the first form, and the at least one of the intensity of the force and the direction of the force may be identified based on the at least one first pattern of the first form and the at least one second pattern of the second form.

The at least one first pattern of the first form may include a circular pattern and the at least one second pattern of the second form may include a linear pattern.

The identifying the at least one of the intensity of the force and the direction of the force may include identifying, based on the circular pattern, a rotational force that is parallel to the contact portion based on a displacement of the linear pattern.

The at least one second pattern may include a plurality of second patterns and adjacent patterns of the plurality of second patterns may vary in color.

According to an aspect of the disclosure, a non-transitory computer-readable storage medium may store instructions that, when executed by at least one processor, cause the at least one processor to identify, based on at least one surface of a contact portion of an electronic apparatus contacting an object, at least one displacement of a plurality of markers of the contact portion based on a first image in which a first surface of the contact portion that is opposite to the at least one surface is captured and identify, based on the at least one displacement, at least one of an intensity of a force applied to the contact portion and a direction of the force applied to the contact portion, where a first marker of the plurality of markers may include at least one of a form and a color that is different from a second marker of the plurality of markers that is adjacent to the first marker.

Each of the plurality of markers may include at least one first pattern of a first form and at least one second pattern of a second form that is provided at one side of the at least one first pattern and the instructions, when executed, may further cause the at least one processor to identify at least one of the intensity of the force and the direction of the force based on the at least one first pattern the at least one second pattern.

The first form may include a circular pattern and the second form may include a linear pattern.

The instructions, when executed, may further cause the at least one processor to identify a rotational force that is parallel to the contact portion based on displacement of the linear pattern.

The at least one second pattern may include a plurality of second patterns and wherein adjacent patterns of the plurality of second patterns vary in color.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1:
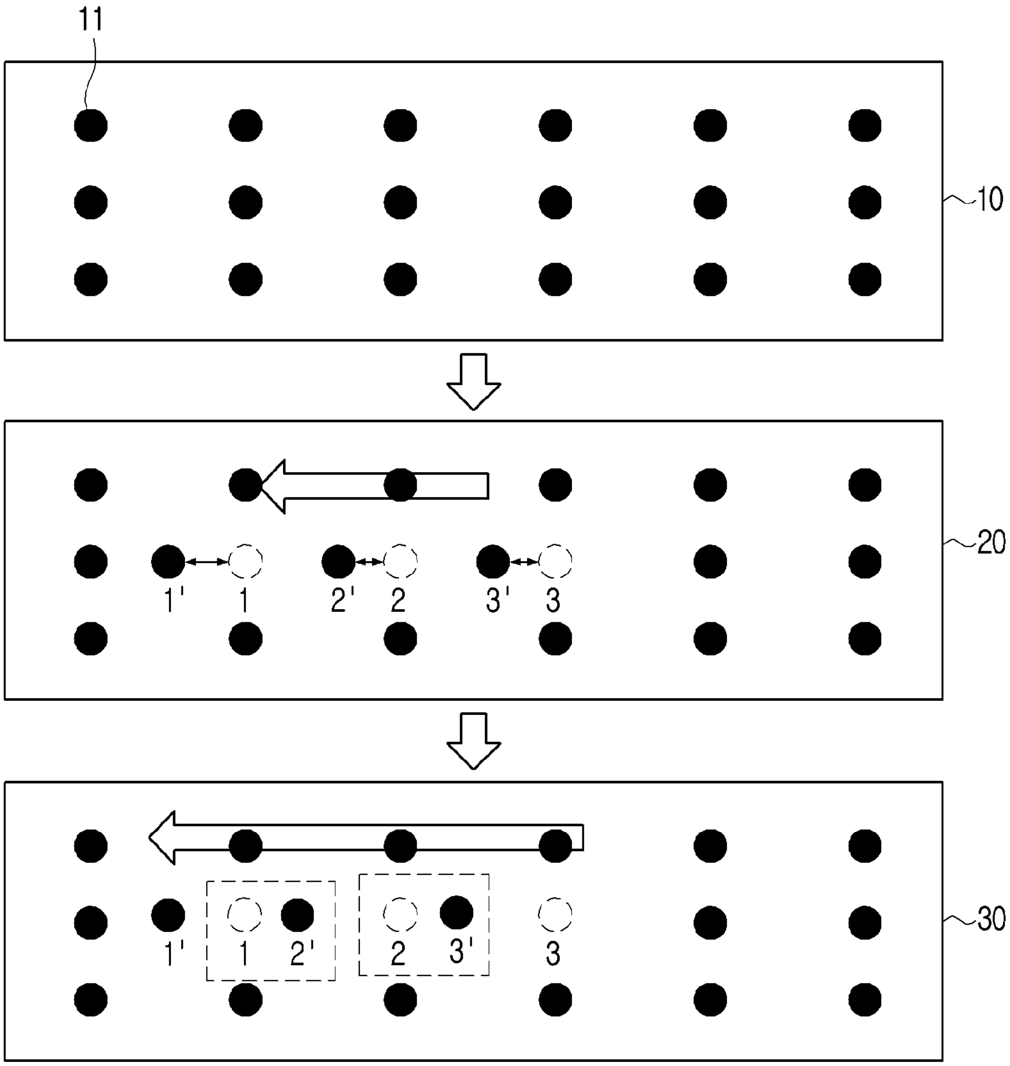
FIG. 1 is a diagram illustrating a sensing method of contact information.

Hereinafter, example embodiments of the disclosure will be described in detail with reference to the accompanying drawings. The same reference numerals are used for the same components in the drawings, and redundant descriptions thereof will be omitted. The embodiments described herein are example embodiments, and thus, the disclosure is not limited thereto and may be realized in various other forms. It is to be understood that singular forms include plural referents unless the context clearly dictates otherwise. The terms including technical or scientific terms used in the disclosure may have the same meanings as generally understood by those skilled in the art.

Terms used in describing one or more embodiments of the disclosure are general terms selected that are currently widely used considering their function herein. However, the terms may change depending on intention, legal or technical interpretation, emergence of new technologies, and the like of those skilled in the related art. Further, in certain cases, there may be terms arbitrarily selected, and in this case, the meaning of the term will be disclosed in greater detail in the corresponding description. Accordingly, the terms used herein are not to be understood simply as its designation but based on the meaning of the term and the overall context of the disclosure In the disclosure, expressions such as "have," "may have," "include," "may include," or the like are used to designate a presence of a corresponding characteristic (e.g., elements such as numerical value, function, operation, or component), and not to preclude a presence or a possibility of additional characteristics.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c Expressions such as "first," "second," "1st," "2nd," and so on used herein may be used to refer to various elements regardless of order and/or importance. Further, it should be noted that the expressions are merely used to distinguish an element from another element and not to limit the relevant elements.

A singular expression may include a plural expression, unless otherwise specified. It is to be understood that the terms such as "form" or "include" are used herein to designate a presence of a characteristic, number, step, operation, element, component, or a combination thereof, and not to preclude a presence or a possibility of adding one or more of other characteristics, numbers, steps, operations, elements, components or a combination thereof.

In this disclosure, the term "user" may refer to a person using an electronic apparatus or an apparatus (e.g., artificial intelligence electronic apparatus) using an electronic apparatus.

FIG. 1 is a diagram illustrating a sensing method of contact information.

An example of a contact portion of a robot hand is shown at 10. The contact portion may include a plurality of markers, such as marker 11, as shown in 10 of FIG. 1. Each of the markers may have a circular pattern.

The contact portion may be implemented with gel, and a robot may obtain contact information based on the plurality of markers included in the contact portion. Contact information may include an intensity, a direction, and the like of force applied at the contact portion.

For example, as shown at 20, when a shear force is generated from a contact portion in a left direction, the form of the contact portion implemented with gel may be changed by the shear force, such that marker 1 may be moved to position 1', marker 2 may be moved to position 2', and marker 3 may be moved to position 3'. The robot may identify the intensity, direction and the like of the force applied to the contact portion based on displacement of marker 1, marker 2, and marker 3.

However, when the intensity of the force applied to the contact portion is increased, a problem such as that shown at 30 may occur. Specifically, marker 1 may be moved to position 1', marker 2 may be moved to position 2', and marker 3 may be moved to position 3'. Since the intensity of the force at this time is greater at 30 than at 20, position 2' may be moved to be closer to position 1 than position 2, and position 3' may be moved to be closer to position 2 than position 3. In this case, the robot may identify that marker 1 has moved to position 2', and marker 2 has moved to position 3'. That is, the force in a right direction may be identified as a force in the left direction, and an error may occur. Accordingly, there is a need to reduce the error as described above.

Figure 2:
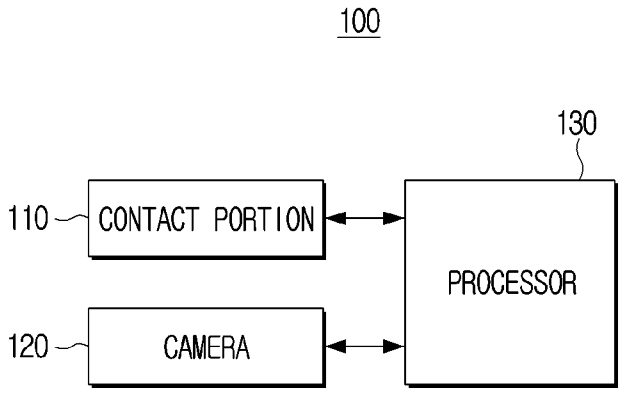
FIG. 2 is a block diagram illustrating a configuration of an electronic apparatus according to one or more embodiments of the disclosure.

FIG. 2 is a block diagram illustrating a configuration of an electronic apparatus according to one or more embodiments of the disclosure.

The electronic apparatus 100 may be an apparatus that obtains contact information. For example, the electronic apparatus 100 may be a robot. Alternatively, the electronic apparatus 100 may be a robot hand or a finger part of the robot hand. Alternatively, the electronic apparatus 100 may be a type of an optical tactile sensor.

However, the above is not limited thereto, and the electronic apparatus 100 may be any apparatus that obtains contact information.

Referring to FIG. 2, the electronic apparatus 100 may include a contact portion 110, a camera 120, and a processor 130.

The contact portion 110 may include a plurality of markers. A first marker from among the plurality of markers may be configured such that at least one from among a form or a color is different from a second marker that is adjacent to the first marker.

For example, each of the markers may include a pattern of a first form and a pattern of a second form provided (e.g., positioned) at one side of the pattern of the first form. The pattern of the first form and the pattern of the second form may be different. In an example, the pattern of the first form may be in a circular pattern, and the pattern of the second form may be in a linear pattern. However, the above is not limited thereto, and the pattern of the first form may be in a quadrangle pattern, and the pattern of the second form may be in the linear pattern. The pattern of the first form and the pattern of the second form may be implemented as any various forms. In addition, each of the markers may be implemented as not just the pattern of the first form and the pattern of the second form, but also as patterns of at least three forms.

Alternatively, adjacent patterns of the second form from among a plurality of patterns of the second form included in the plurality of markers may vary in color.

Alternatively, the first marker from among the plurality of markers may include a circular first pattern and a linear first pattern oriented from the circular first pattern toward a first direction, the second marker from among the plurality of markers may be adjacent to the first marker in a direction opposite to the first direction, and include a circular second pattern and a linear second pattern oriented from the circular second pattern toward a second direction perpendicular to the first direction, a third marker from among the plurality of markers may be adjacent to the second marker in a direction opposite to the second direction, and include a circular third pattern and a linear third pattern oriented from the circular third pattern toward a third direction perpendicular to the second direction, and a fourth marker from among the plurality of markers may be adjacent to the third marker in a direction opposite to the third direction, and include a circular fourth pattern and a linear fourth pattern oriented from the circular fourth pattern toward a fourth direction perpendicular to the third direction.

Alternatively, each of the markers may include the pattern of the first form, or the pattern of the first form and at least one pattern of the second form formed adjacently to the pattern of the first form.

The plurality of markers may be implemented in any various forms, and the above will be described in greater detail through the drawings.

The contact portion 110 may include a transparent gel, a plurality of markers printed at one surface of the gel, and a coating layer formed at an upper end of the plurality of markers. The coating layer may prevent the plurality of markers from being worn. However, the above is not limited thereto, and the gel may be semi-transparent, and may be any material of a transparent degree through which the plurality of markers may be identified through the camera 120. In addition, the above may be implemented with another material that is not a gel.

The camera 120 may be a configuration for capturing a still image or a moving image. The camera 120 may capture the still image at a specific time point, but may also capture the still image consecutively.

The camera 120 may include a lens, a shutter, an aperture, a solid-state imaging device, an analog front end (AFE), and a timing generator (TG). The shutter may be configured to adjust a time during which light reflected from a subject enters the camera 120, and the aperture may be configured to adjust an amount of light incident to the lens by mechanically increasing or decreasing a size of an opening part through which light enters. The solid-state imaging device may be configured to output, based on light reflected from the subject being accumulated as photo charge, an image by the photo charge as an electric signal. The TG may be configured to output a timing signal for reading out pixel data of the solid-state imaging device, and the AFE may be configured to digitalize the electric signal output from the solid-state imaging device by sampling.

The camera 120 may capture the contact portion 110 according to a control of the processor 130. The processor 130 may identify positions of the plurality of markers from the captured image.

The processor 130 may be provided as a single processor or multiple processors, and may be implemented in a single device or multiple devices. The processor 130 may be referred to herein as at least one processor 130. The processor 130 may control the overall operation of the electronic apparatus 100. Specifically, the processor 130 may control the overall operation of the electronic apparatus 100 by being connected with each configuration of the electronic apparatus 100. For example, the processor 130 may control an operation of the electronic apparatus 100 by being connected with configurations such as, for example, and without limitation, the contact portion 110, the camera 120, a memory, and the like.

At least one processor 130 may include at least one from among a central processing unit (CPU), a graphics processing unit (GPU), an accelerated processing unit (APU), a many integrated core (MIC), a neural processing unit (NPU), a hardware accelerator, or a machine learning accelerator. The at least one processor 130 may control one or a random combination from among other elements of the electronic apparatus 100, and perform an operation associated with communication or data processing. The at least one processor 130 may execute at least one program or instruction stored in the memory. For example, the at least one processor 130 may perform, by executing at least one instruction stored in the memory, a method according to one or more embodiments of the disclosure.

When a method according to one or more embodiments of the disclosure include a plurality of operations, the plurality of operations may be performed by one processor, or performed by the plurality of processors. For example, when a first operation, a second operation, and a third operation are performed by a method according to one or more embodiments, the first operation, the second operation, and the third operation may all be performed by a first processor, or the first operation and the second operation may be performed by the first processor (e.g., generic-purpose processor) and the third operation may be performed by a second processor (e.g., artificial intelligence dedicated processor).

The at least one processor 130 may be implemented as a single core processor that includes one core, or as at least one multicore processor that includes a plurality of cores (e.g., a homogeneous multicore or a heterogeneous multicore). If the at least one processor 130 is implemented as a multicore processor, each of the cores included in the multicore processor may include a memory inside the processor such as a cache memory and an on-chip memory, and a common cache shared by the plurality of cores may be included in the multicore processor. In addition, each of the cores (or a portion from among the plurality of cores) included in the multicore processor may independently read and perform a program command for implementing a method according to one or more embodiments, or read and perform a program command for implementing a method according to one or more embodiments of the disclosure due to a whole (or a portion) of the plurality of cores being interconnected.

When a method according to one or more embodiments of the disclosure include a plurality of operations, the plurality of operations may be performed by one core from among the plurality of cores or performed by the plurality of cores included in the multicore processor. For example, when a first operation, a second operation, and a third operation are performed by a method according to one or more embodiments, the first operation, the second operation, and the third operation may all be performed by a first core included in the multicore processor, or the first operation and the second operation may be performed by the first core included in the multicore processor and the third operation may be performed by a second core included in the multicore processor.

According to one or more embodiments, the at least one processor 130 may refer to a system on chip (SoC), a single core processor, or a multicore processor in which the at least one processor and other electronic components are integrated or a core included in the single core processor or the multicore processor, and the core herein may be implemented as the CPU, the GPU, the APU, the MIC, the NPU, the hardware accelerator, the machine learning accelerator, or the like, but the embodiments of the disclosure are not limited thereto. However, for convenience of description, an operation of the electronic apparatus 100 will be described below using the expression 'processor 130.'

The processor 130 may identify, based on one surface of the contact portion 110 contacting an object, at least one displacement of the plurality of markers based on a first image in which an opposite surface of the contact portion 110 is captured through the camera 120, and identify at least one of the intensity of the force applied to the contact portion 110 or the direction of the force based on the identified displacement.

For example, when each of the markers include the pattern of the first form and the pattern of the second form provided at one side of the pattern of the first form, the processor 130 may identify at least one of the intensity of the force or the direction of the force based on the pattern of the first form and the pattern of the second form. In an example, if the pattern of the first form is the circular pattern, and the pattern of the second form is the linear pattern, the processor 130 may identify, based on the circular pattern, a rotational force parallel to the contact portion based on the displacement of the linear pattern provided at one side of the circular pattern.

The electronic apparatus 100 may further include a memory storing a second image of the opposite surface of the contact portion 110 that is captured through the camera 120 prior to the one surface of the contact portion 110 contacting the object, and the processor 130 may identify at least one displacement of the plurality of markers based on the first image and the second image. That is, the processor 130 may identify at least one displacement of the plurality of markers by comparing the second image with a currently captured first image.

In addition, the processor 130 may capture a plurality of images at pre-set time intervals, and identify at least one variance of the intensity or direction of the force by comparing the second image with each of the plurality of images. For example, the processor 130 may identify that the direction of the force is toward a left side by comparing an image captured at time point T1 with the second image, and identify that the direction of the force is toward a right side by comparing an image captured at time point T2, which is after the time point T1, with the second image. In this case, the processor 130 may identify that the direction of the force is changed gradually.

Alternatively, the processor 130 may capture a plurality of images at pre-set time intervals, identify a variance in intensity of the force by comparing the second image with each of the plurality of images, predict an intensity of the force at a future time point based on the variance, and change the contact portion 110 is to be contacted based on the predicted intensity of the force. For example, the processor 130 may capture the plurality of images at pre-set time intervals, and stop the contact of the object with the contact portion 110, based on identifying that the intensity of the force is gradually increasing by comparing the second image with each of the plurality of images, and that the contact portion 110 is to be damaged after a determined time period (e.g., three seconds) according to the increasing tendency. However, the above is not limited thereto, and the processor 130 may stop the contact of the object with the contact portion 110 prior to the pre-set time from a time point at which the contact portion 110 is predicted to be damaged. In an example, the processor 130 may stop, based on the contact portion 110 being identified as to be damaged after a determined amount of time (e.g., three seconds), the contact of the object with the contact portion 110 after two seconds which is one second prior to the time point at which the contact portion 110 is predicted as to be damaged.

The processor 130 may provide, based on the contact portion 110 being damaged, a damage message to a user. For example, the processor 130 may capture the contact portion 110 through the camera 120 while the contact portion 110 is not contacting the object, and identify the contact portion 110 as damaged based on the captured image being changed by an amount that is greater than or equal to a pre-set level with the second image. The processor 130 may display, based on the contact portion 110 being identified as damaged, a damage message or provide the damage message as a sound.

The processor 130 may update the second image when a pre-set use time is passed. For example, the contact portion 110 may have gel deformation and the like because of physical force being applied, and accordingly, the positions of the plurality of markers may vary from that of the second image even when the contact portion 110 is not contacted by the object. Accordingly, the processor 130 may capture, when the pre-set use time is passed, the contact portion 110 through the camera 120 while the contact portion 110 is not contacting the object, and update the second image with the captured image.

The electronic apparatus 100 may further include a lens array which is formed at the opposite surface of the contact portion 110, the lens array including a plurality of lenses that correspond to each of the markers. The processor 130 may identify a size change of the plurality of markers through the lens array, and identify force in a direction perpendicular to the contact portion 110 based on the identified size change.

For example, the processor 130 may identify that, based on a size of at least one of the plurality of markers being increased, the force in the direction perpendicular to the contact portion 110 is being applied.

However, the above is not limited thereto, and the lens array may be implemented such that one lens enlarges a portion of the plurality of markers. In an example, the lens array may be implemented such that one lens corresponds to four markers. Alternatively, the lens array may be implemented in a form that includes a lens corresponding to a portion from among the plurality of markers. For example, a lens may be provided at a center marker from among 3×3 markers, and a lens may not be provided at remaining markers from among the 3×3 markers. The processor 130 may identify force in the direction perpendicular to the contact portion 110 based on the size change of the marker provided with the lens.

Alternatively, the processor 130 may identify the force in the direction perpendicular to the contact portion 110 even without the lens array. For example, when the force in the direction perpendicular to the contact portion 110 is applied, displacement is increased according to the marker that is arranged closer to a center point of the force in the perpendicular direction, and displacement of the markers around the center point may face the center point. The processor 130 may detect the displacement and identify the force in the direction perpendicular to the contact portion 110 based on the marker displacement rather than based on the size change of the marker.

The memory may store a neural network model. The processor 130 may identify at least one from among the intensity of the force or the direction of the force by inputting the first image and the second image in the neural network model.

Functions associated with artificial intelligence according to the disclosure may be operated through the processor 130 and the memory.

The processor 130 may be formed of one or a plurality of processors. The one or plurality of processors may be a generic-purpose processor such as a CPU, an application processor (AP), a digital signal processor (DSP), and the like, a graphics dedicated processor such as a GPU and a vision processing unit (VPU), or an artificial intelligence dedicated processor such as an NPU.

The one or plurality of processors may control for the input data to be processed according to a pre-defined operation rule or an artificial intelligence model stored in the memory. Alternatively, if the one or plurality of processors is the artificial intelligence dedicated processor, the artificial intelligence dedicated processor may be designed to a hardware structure specializing in the processing of a specific artificial intelligence model. The pre-defined operation rule or the artificial intelligence model may be characterized by being created through learning.

The learning may refer to a pre-defined operation rule or artificial intelligence model set to perform a desired feature (or, purpose) being trained by a learning algorithm using a plurality of learning data. The learning may be performed in a device itself in which the artificial intelligence according to the disclosure is performed, or performed through a separate server and/or system. Examples of the learning algorithm may include a supervised learning, an unsupervised learning, a semi-supervised learning, or a reinforcement learning, but is not limited to the above-described examples.

The artificial intelligence model may be formed of a plurality of neural network layers. Each of the neural network layers may include a plurality of weight values, and perform a neural network computation through computation between a computation result of a previous layer and the plurality of weight values. The plurality of weight values included in the plurality of neural network layers may be optimized by a learning result of the artificial intelligence model. For example, the plurality of weight values may be updated for a loss value or a cost value obtained by the artificial intelligence model during the learning process to be reduced or minimized.

The artificial neural network may include a deep neural network (DNN), and examples thereof may include a convolutional neural network (CNN), a deep neural network (DNN), a recurrent neural network (RNN), a restricted boltzmann machine (RBM), a deep belief network (DBN), a bidirectional recurrent deep neural network (BRDNN), a generative adversarial network (GAN), a deep-Q networks, or the like, but are not limited thereto.

Figure 3:
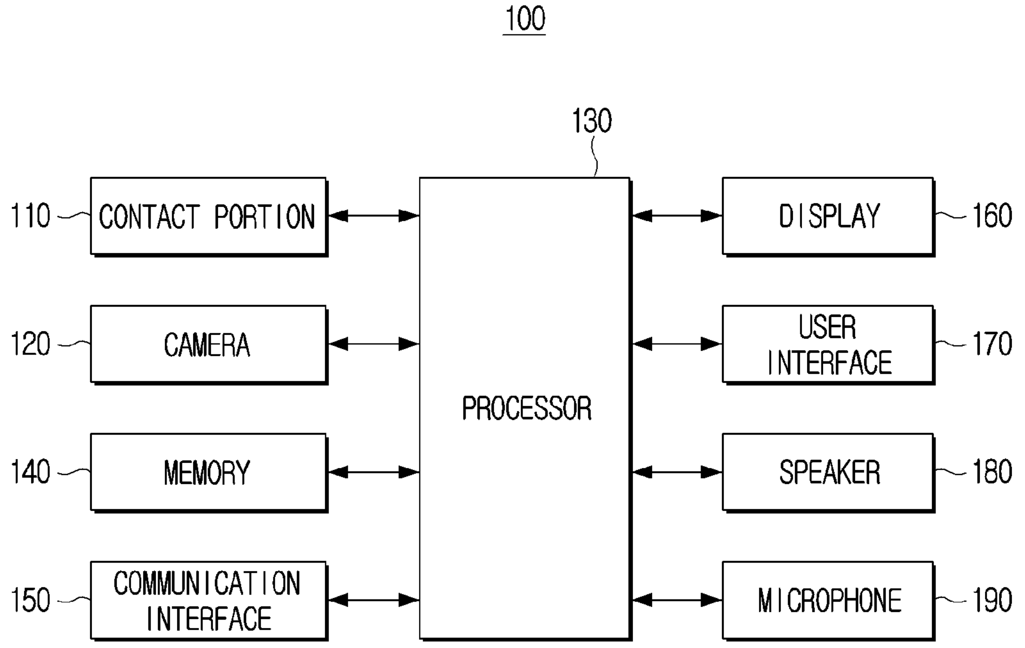
FIG. 3 is a block diagram illustrating a detailed configuration of an electronic apparatus according to one or more embodiments of the disclosure.

FIG. 3 is a block diagram illustrating a detailed configuration of an electronic apparatus according to one or more embodiments of the disclosure. The electronic apparatus 100 may include the contact portion 110, the camera 120, and the processor 130. In addition, referring to FIG. 3, the electronic apparatus 100 may further include a memory 140, a communication interface 150, a display 160, a user interface 170, a speaker 180, and a microphone 190. Detailed descriptions on parts that overlap with the elements shown in FIG. 2 from among the elements shown in FIG. 3 will be omitted.

The memory 140 may refer to a hardware that stores information such as data in electric or magnetic form for the processor 130 and the like to access. To this end, the memory 140 may be implemented as at least one hardware from among a non-volatile memory, a volatile memory, a flash memory, a hard disk drive (HDD) or a solid state drive (SSD), a random access memory (RAM), a read only memory (ROM), and the like.

In the memory 140, at least one instruction for an operation of the electronic apparatus 100 or the processor 130 may be stored. The instruction may be a code unit that instructs an operation of the electronic apparatus 100 or the processor 130, and may be prepared in a machine language understood by a computer. Alternatively, the memory 140 may store a plurality of instructions that perform a specific work of the electronic apparatus 100 or the processor 130 as an instruction set.

The memory 140 may store data which is information in a bit or byte unit that may represent a character, a number, an image, and the like. For example, the memory 140 may store the second image, the neural network model, and the like.

The memory 140 may be accessed by the processor 130 and reading, writing, modifying, deleting, updating, and the like of the instruction, the instruction set, or data may be performed by the processor 130.

The communication interface 150 may be a configuration that performs communication with external apparatuses of various types according to communication methods of various types. For example, the electronic apparatus 100 may perform communication with a server, another electronic apparatus, a sensor of another electronic apparatus, and the like through the communication interface 150.

The communication interface 150 may include a Wi-Fi module, a Bluetooth module, an infrared communication module, a wireless communication module, and the like. Each communication module may be implemented in at least one hardware chip form.

The Wi-Fi module and the Bluetooth module may perform communication in a Wi-Fi method and a Bluetooth method, respectively. When using the Wi-Fi module or the Bluetooth module, various connection information such as a service set identifier (SSID) and a session key may first be transmitted and received, and after communicatively connecting using the same, various information may be transmitted and received. The infrared communication module may perform communication according to an infrared communication (Infrared Data Association (IrDA)) technology of transmitting data wirelessly in short range by using infrared rays present between visible rays and millimeter waves.

The wireless communication module may include at least one communication chip that performs communication according to various wireless communication standards such as, for example, and without limitation, ZigBee, 3rd Generation (3G), 3rd Generation Partnership Project (3GPP), Long Term Evolution (LTE), LTE Advanced (LTE-A), 4th Generation (4G), 5th Generation (5G), and the like, in addition to the above-described communication methods.

Alternatively, the communication interface 150 may include a wired communication interface such as, for example, and without limitation, high definition multimedia interface (HDMI), DisplayPort (DP), Thunderbolt, universal serial bus (USB), RGB, D-SUB, digital visual interface (DVI), and the like.

In addition thereto, the communication interface 150 may include at least one from among the wired communication modules that perform communication using the local area network (LAN) module, the Ethernet module, or the pair cable, the coaxial cable or the optical fiber cable, or the like.

The display 160 may be a configuration that displays an image, and may be implemented as a display of various forms such as a liquid crystal display (LCD), an organic light emitting diode (OLED) display, and a plasma display panel (PDP). In the display 160, a driving circuit, which may be implemented in the form of an a-si thin film transistor (TFT), a low temperature poly silicon (LTPS) TFT, an organic TFT (OTFT), or the like, a backlight unit, and the like may be included. The display 160 may be implemented as a touch screen coupled with a touch sensor, a flexible display, a three-dimensional (3D) display, or the like.

The processor 130 may control the display 160 to display at least one from among the intensity of the force or the direction of the force. Alternatively, the processor 130 may control the display 160 to warn of damage to the contact portion 110, notify of the damage, and the like.

The user interface 170 may be implemented with a button, a touch pad, a mouse and a keyboard, or implemented as a touch screen capable of performing a display function and an operation input function together therewith. The button may be a button of various types such as a mechanical button, a touch pad, or a wheel which is formed at a random area at a front surface part or a side surface part, a rear surface part, or the like of an exterior of a main body of the electronic apparatus 100.

The speaker 180 may be an element that outputs not only various audio data processed in the processor 130, but also various notification sounds, voice messages, or the like.

The processor 130 may control the speaker 180 to output sound that guides a state of the contact portion 110.

The microphone 190 may be a configuration for receiving sound and converting to an audio signal. The microphone 190 may be electrically connected with the processor 130, and may receive sound by the control of the processor 130.

For example, the microphone 190 may be formed as an integrated-type integrated to an upper side or a front surface direction, a side surface direction or the like of the electronic apparatus 100. Alternatively, the microphone 190 may be provided in a remote controller, or the like separate from the electronic apparatus 100. In this case, the remote controller may receive sound through the microphone 190, and provide the received sound to the electronic apparatus 100.

The microphone 190 may include various configurations such as a microphone that collects sound of an analog form, an amplifier circuit that amplifies the collected sound, an analog-to-digital (A/D) converter circuit that samples the amplified sound and converts to a digital signal, a filter circuit that removes noise components from the converted digital signal, and the like.

The microphone 190 may be implemented in a form of a sound sensor, and may be any method so long as it is a configuration that can collect sound.

The processor 130 may also receive the user command through the microphone 190.

As described above, the electronic apparatus 100 may identify various directions of the force using the contact portion 110 which includes the plurality of markers implemented in various forms and colors, and reduce sensing errors even if the displacement is somewhat larger. In addition, the electronic apparatus 100 may include a lens array and more accurately identify the force perpendicular to the contact portion 110.

In FIG. 2 and FIG. 3, the contact portion 110, the camera 120, and the processor 130 have been respectively described as separate elements, but are not limited thereto. For example, one processor may control five contact portions and five cameras. Alternatively one camera may capture two contact portions, and sense the force applied to the two contact portions with one processor.

In addition, an operation of the electronic apparatus 100 will be described in greater detail below Separate embodiments will be described. However, the separate embodiments of FIG. 4 to FIG. 14 may be implemented in any combined state.

Figure 4:
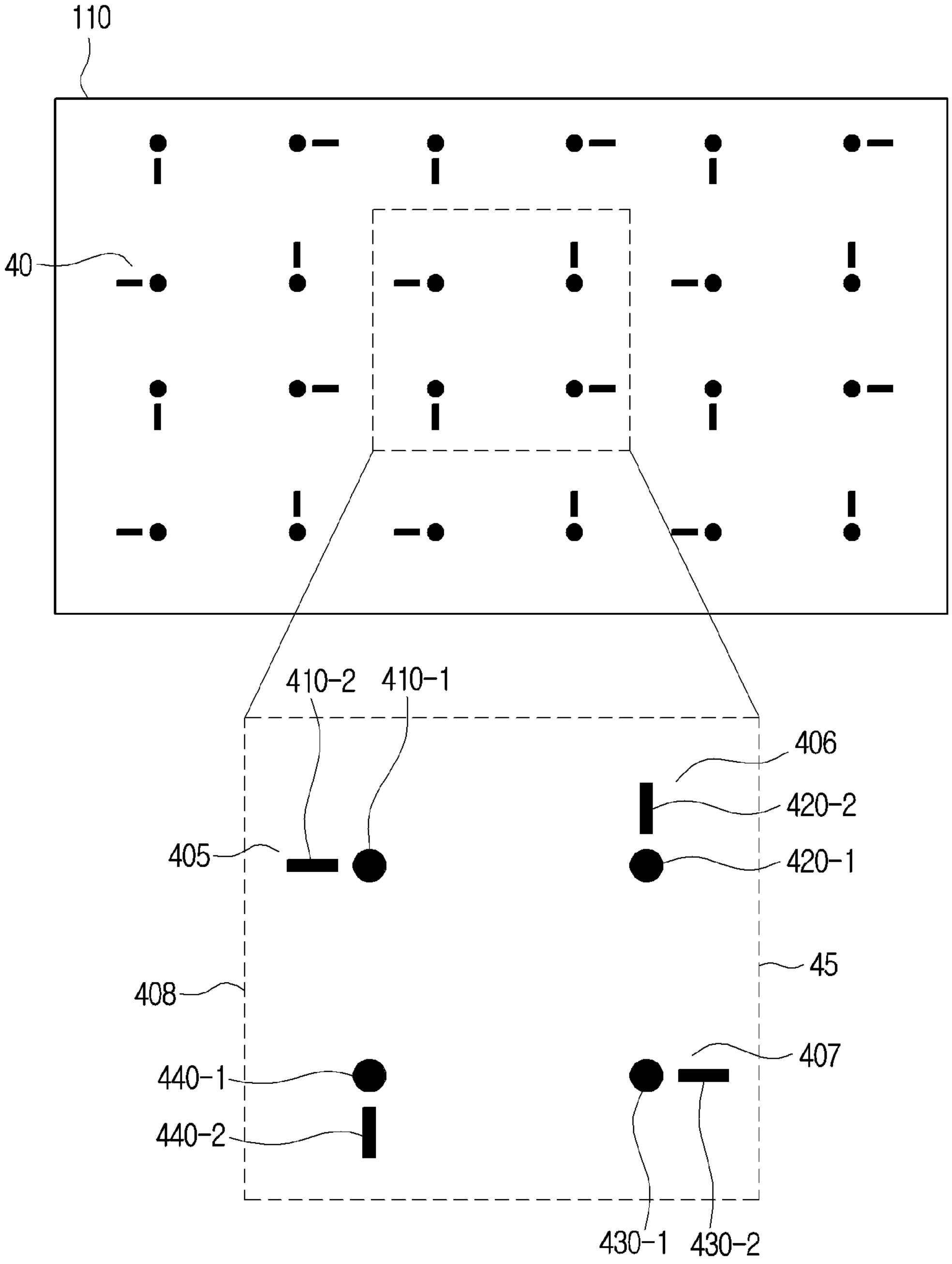
FIG. 4 is a diagram illustrating a plurality of markers according to one or more embodiments of the disclosure.

FIG. 4 is a diagram illustrating a plurality of markers according to one or more embodiments of the disclosure.

As shown in FIG. 4, the first marker 405 from among the plurality of markers, such as marker 40, included in the contact portion 110 may include a circular first pattern 410-1 and a linear first pattern 410-2 oriented from the circular first pattern 410-1 toward a first direction. The second marker 406 of the plurality of markers may be adjacent to the first marker 405 in a direction opposite the first direction, and include a circular second pattern 420-1 and a linear second pattern 420-2 oriented from the circular second pattern 420-1 toward a second direction perpendicular to the first direction. The third marker 407 of the plurality of markers may be adjacent to the second marker 406 in a direction opposite the second direction, and include a circular third pattern 430-1 and a linear third pattern 430-2 oriented from the circular third pattern 430-1 toward a third direction perpendicular to the second direction. The fourth marker 408 of the plurality of markers may be adjacent to the third marker in a direction opposite the third direction, and include a circular fourth pattern 440-1 and a linear fourth pattern 440-2 oriented from the circular fourth pattern 440-1 toward a fourth direction perpendicular to the third direction.

In this case, the processor 130 may not confuse the first marker 405 with the second marker 406 due to the linear first pattern 410-2 and the linear second pattern 420-2 even if the first marker 405 is moved to the position of the second marker 406, and accordingly, the problem resulting from interference may be solved.

In FIG. 4, for convenience of description, four markers may be a basic unit 45, and the contact portion 110 has been shown as being formed with markers in a form of the four markers of the basic unit 45 being repeated, but is not limited thereto. For example, nine markers of different forms from one another may be a basic unit, and the contact portion 110 may be formed with markers in a form as the nine markers being repeated, and may be implemented to any various forms.

Figure 5:
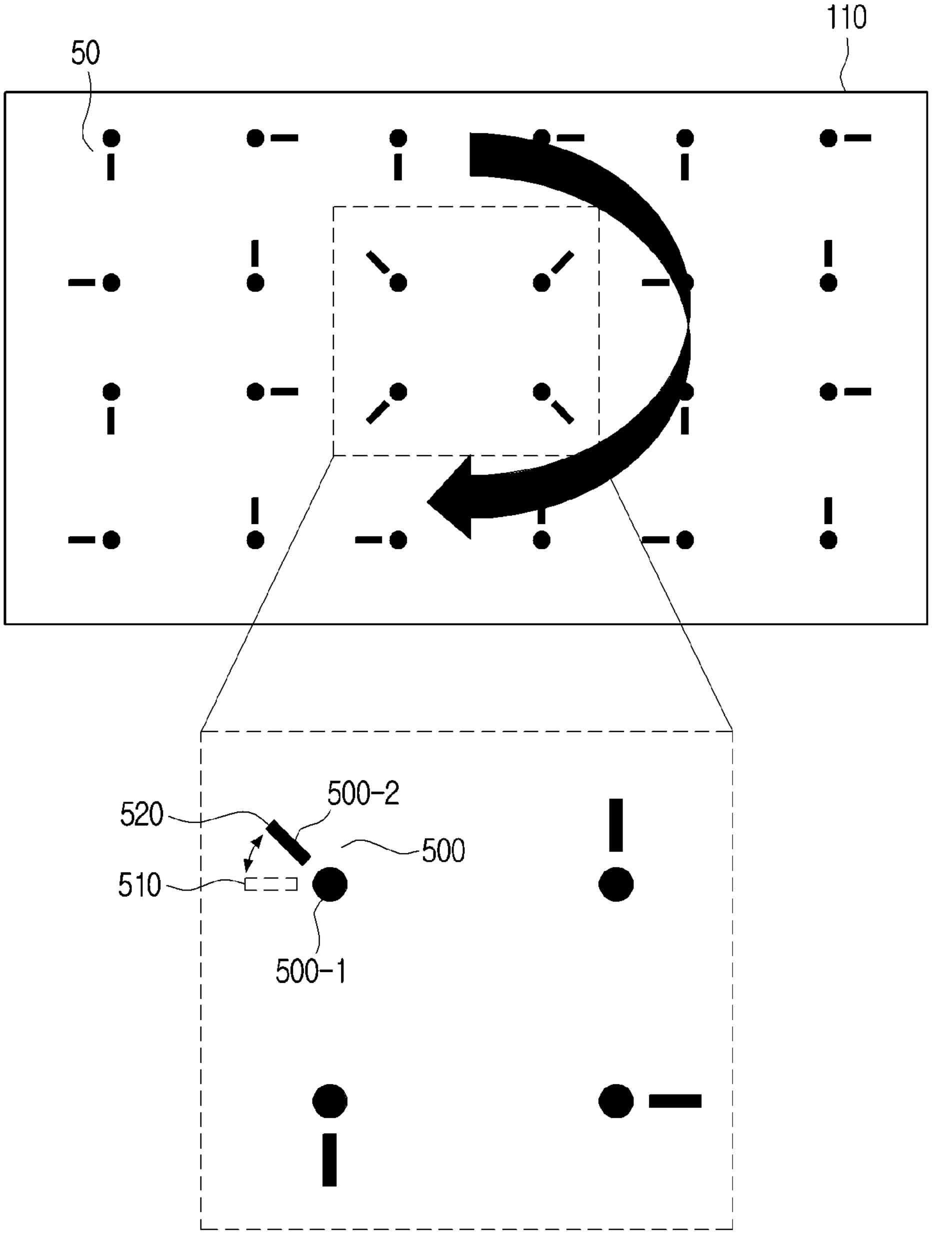
FIG. 5 is a diagram illustrating a measurement of rotational force according to one or more embodiments of the disclosure.

FIG. 5 is a diagram illustrating a measurement of rotational force according to one or more embodiments of the disclosure. In FIG. 5, the plurality of markers, such as marker 50 are described as being implemented in the form as in FIG. 4 for convenience of description.

A first marker 500 is shown, and includes a circular pattern 500-1 and a linear pattern 500-2. The processor 130 may identify, based on the circular pattern 500-1, the rotational force parallel to the contact portion 110 based on the displacement of the linear pattern 500-2 formed at one side of the circular pattern 500-1.

For example, as shown in FIG. 5, the processor 130 may identify, based on the linear pattern 500-2 formed at one side of the circular pattern 500-1 moving from position 510 to position 520, a rotational angle of the linear pattern 500-2 based on the circular pattern 500-1, and identify the rotational force parallel to the contact portion 110 based on the rotational angle.

Figure 6:
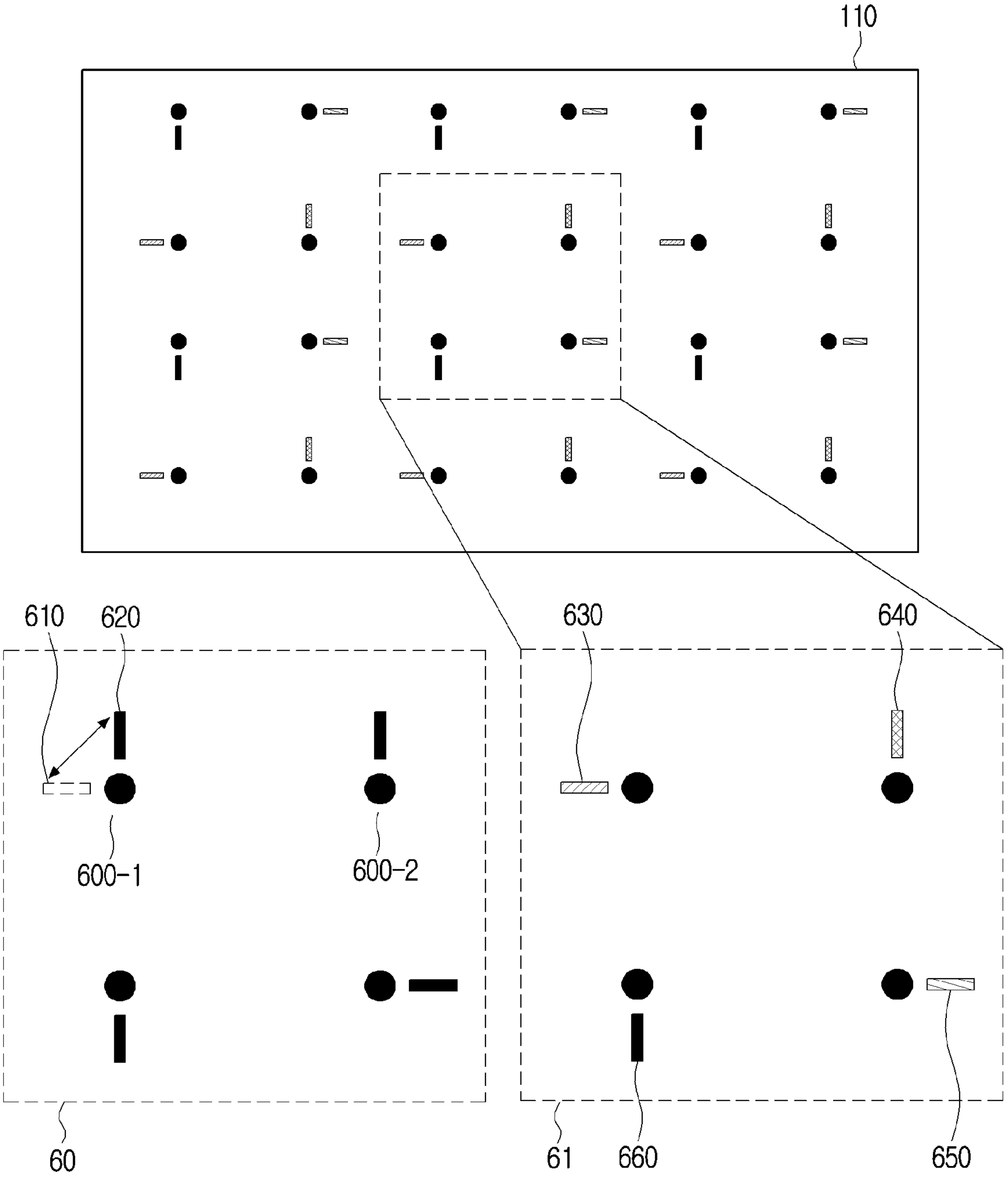
FIG. 6 is a diagram illustrating a plurality of markers including colors according to one or more embodiments of the disclosure.

FIG. 6 is a diagram illustrating a plurality of markers including colors according to one or more embodiments of the disclosure.

As shown in 60, when the linear pattern is rotated 90 degrees from the marker 600-1, the linear pattern may move from positon 610 to position 620 and distinguishing marker 600-1 from marker 600-2 may be difficult.

The contact portion 110 may include colors added to the linear pattern according to one or more embodiments. In this case, as shown in 61, a first linear pattern 630, a second linear pattern 640, a third linear pattern 650, and a fourth linear pattern 660 may all have different colors, and even if the first linear pattern 630 is rotated 90 degrees and the form becomes same as with the adjacent marker to the right side, distinguishing between the markers may be possible because the color is different from the second linear pattern 640. Accordingly, the sensing error of the processor 130 may be reduced.

In FIG. 6, for convenience of description, the use of four colors has been described, but the above is not limited thereto. For example, the above may be implemented in a form in which the colors of the first linear pattern 630 and the third linear pattern 650 are the same, and the colors of the second linear pattern 640 and the fourth linear pattern 660 are the same. In addition, the colors of the circular patterns may be different, and may be implemented with any various methods.

Figure 7:
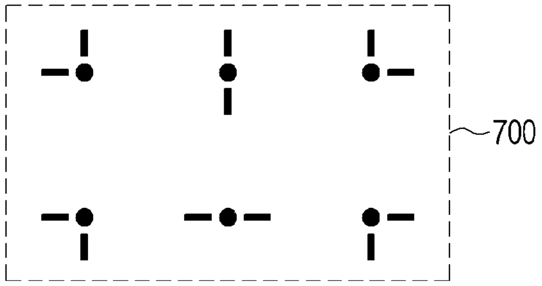
FIGS. 7 and 8 are diagrams illustrating a basic unit of a marker according to one or more embodiments of the disclosure.
Figure 8:
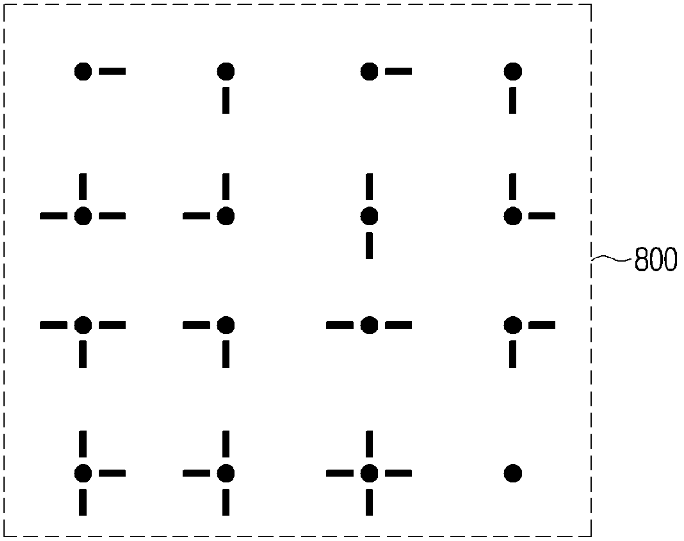

FIGS. 7 and 8 are diagrams illustrating a basic unit of a marker according to one or more embodiments of the disclosure.

As shown in FIG. 7, six markers may be the basic unit 700, and the contact portion 110 may be formed with markers in a form as the six markers being repeated. The six markers of the basic unit may all be in different forms.

However, the above is not limited thereto, and the six markers of the basic unit may be implemented such that at least one of the form or color is implemented in a different form.

Alternatively, as shown in FIG. 8, sixteen markers may be the basic unit 800, and the contact portion 110 may be formed with markers in a form as the sixteen markers being repeated. The sixteen markers of the basic unit may all be in different forms.

However, the above is not limited thereto, and the sixteen markers of the basic unit may be implemented such that at least one of the form or color is implemented in a different form.

The displacement measurable by the processor 130 may increase as a number of markers included in the basic unit increases, but manufacturing costs may increase.

Figure 9:
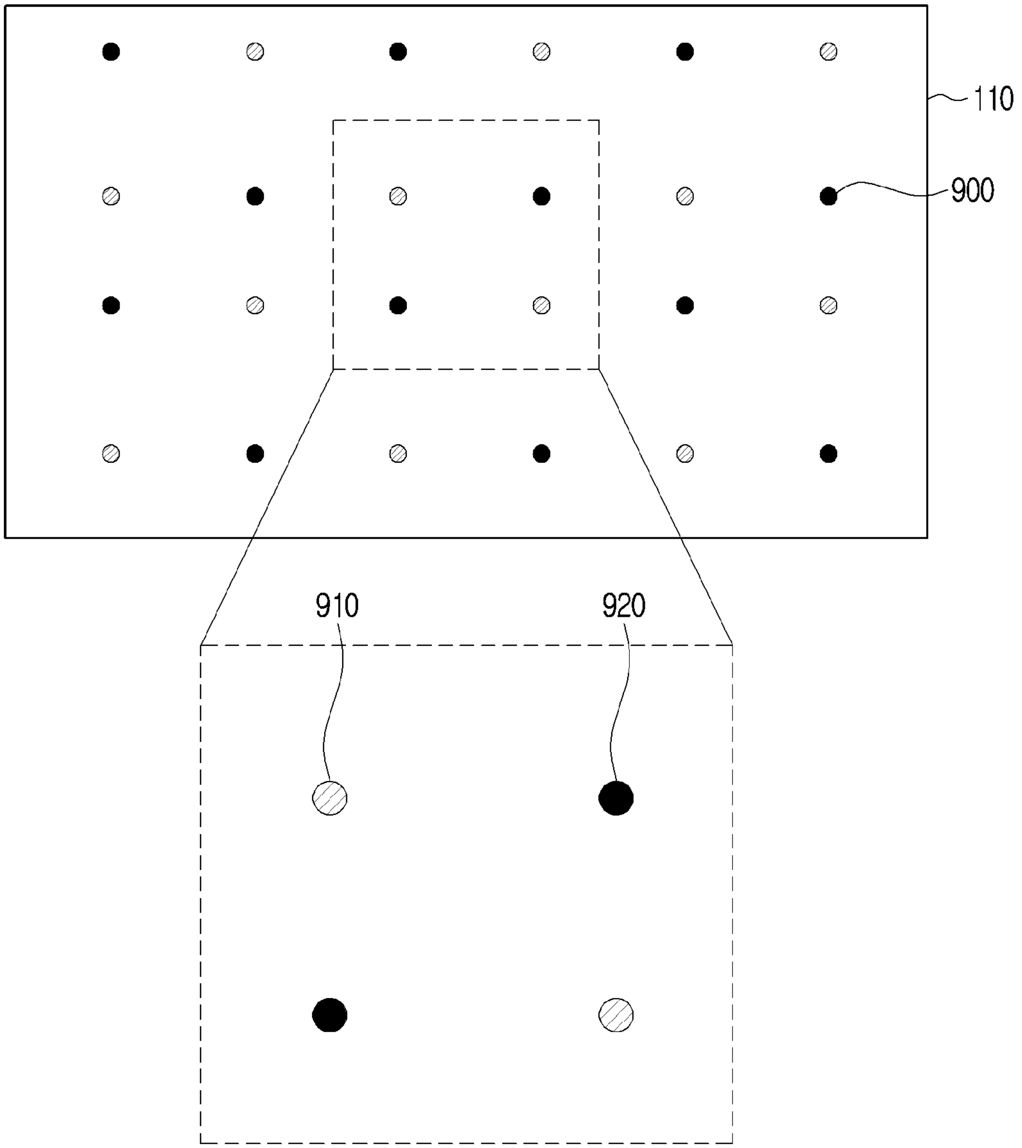
FIGS. 9, 10 and 11 are diagrams illustrating an example of a contact portion being implemented in a circular pattern of different colors according to one or more embodiments of the disclosure.
Figure 10:
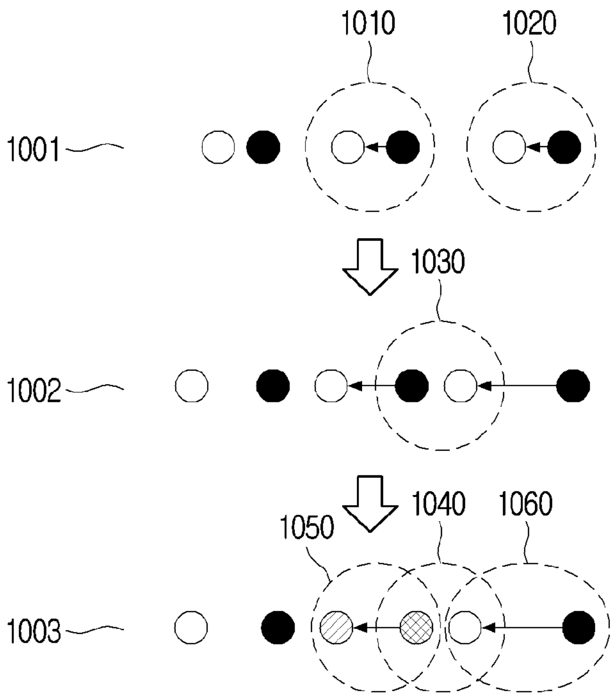
Figure 11:
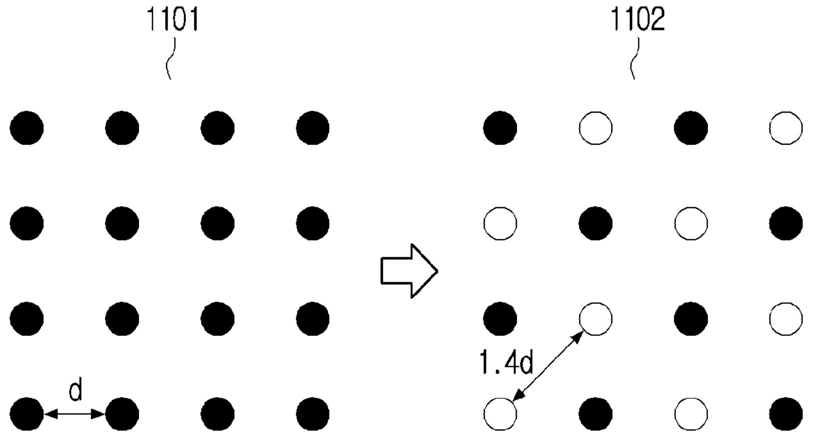

FIGS. 9, 10 and 11 are diagrams illustrating an example of a contact portion being implemented in a circular pattern of different colors according to one or more embodiments of the disclosure.

The contact portion 110 may include, as shown in FIG. 9, a plurality of markers, such as marker 900, having a single form pattern, and the plurality of markers herein may be implemented in two colors. For example, a first marker 910 may be red, and a second marker 920 may be black. In this case, because the forms of the plurality of markers are all the same, manufacturing costs may be reduced.

In addition, because the colors between the markers that are horizontally or vertically adjacent are different, the sensing error of the processor 130 may be reduced. For example, as shown at 1001 of FIG. 10, when the colors between the markers that are horizontally or vertically adjacent are the same and a magnitude of the force is relatively small, there is no occurrence of interference between the adjacent markers because the displacement of the markers are not as large as in 1010 and 1020. However, as shown at 1002 of FIG. 10, when the colors between the markers that are horizontally or vertically adjacent are the same and the magnitude of the force is relatively great, the displacement of the marker may become larger and interference between adjacent markers may occur as with 1030. That is, as shown at 1002 of FIG. 10, even when force is applied toward the left direction, the processor 130 may identify the marker as having moved toward the right, and identify that force has been applied toward the right direction. To this end, as shown at 1003 of FIG. 10, when the colors between the markers that are horizontally and vertically adjacent are different and the magnitude of the force is relatively great, the processor 130 may identify that 1040 are different markers, and that at least one of the intensity of the force or the direction of the force based on 1050 and 1060, even if the displacement of the marker becomes larger.

That is, when the colors between the markers that are horizontally or vertically adjacent are the same, the processor 130 may sense force without error if the displacement is less than d as shown at 1101 of FIG. 11. However, when the colors between the markers that are horizontally or vertically adjacent are different, the force may be sensed without error if the displacement is less than about 1.4d, as shown at 1102 of FIG. 11. That is, when the colors between the markers that are horizontally or vertically adjacent are different, a likelihood of an error occurring may be decreased than when the colors between the markers that are horizontally or vertically adjacent are the same.

Figure 12:
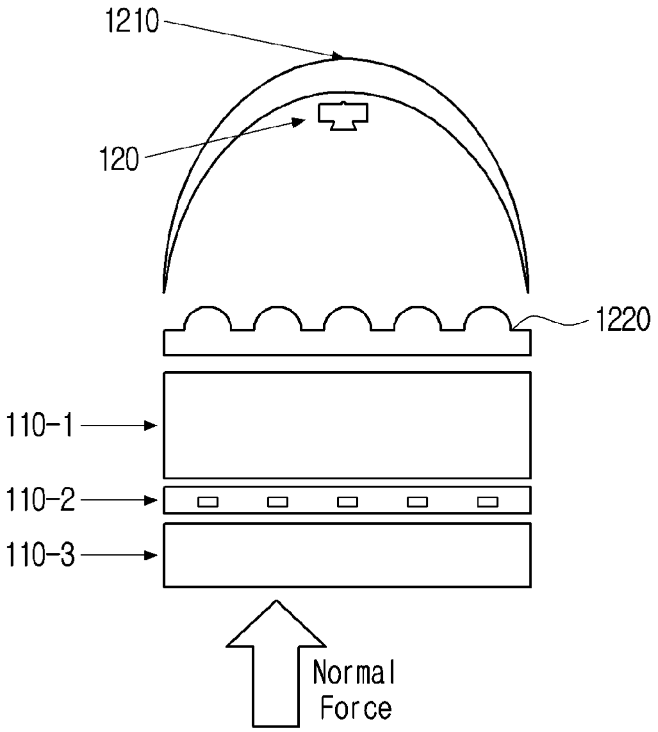
FIGS. 12, 13 and 14 are diagrams illustrating a lens array according to one or more embodiments of the disclosure.
Figure 13:
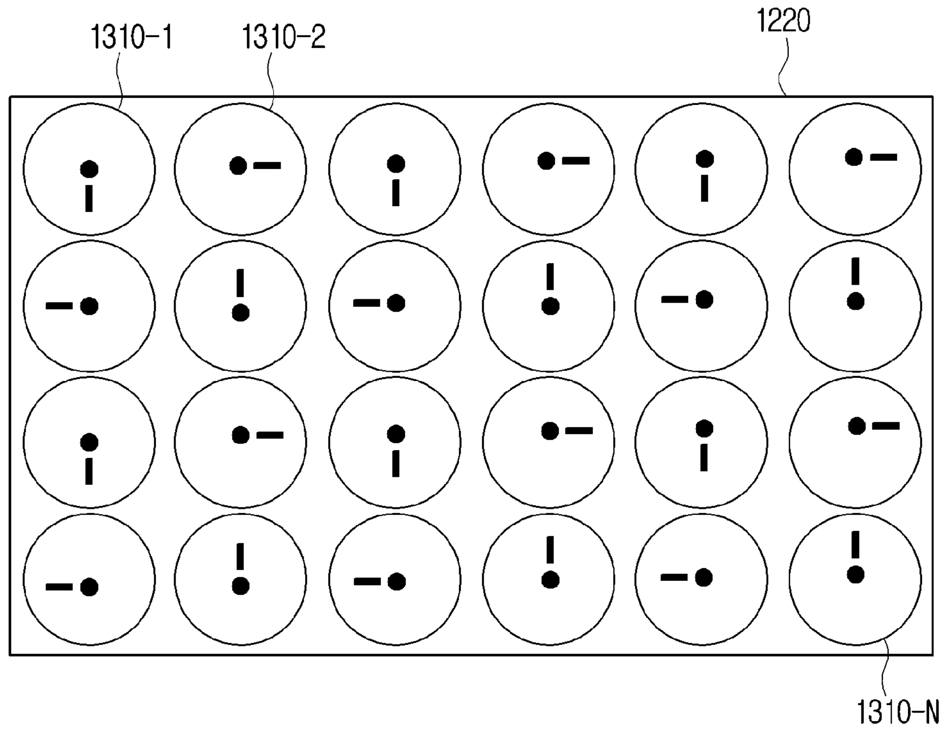
Figure 14:
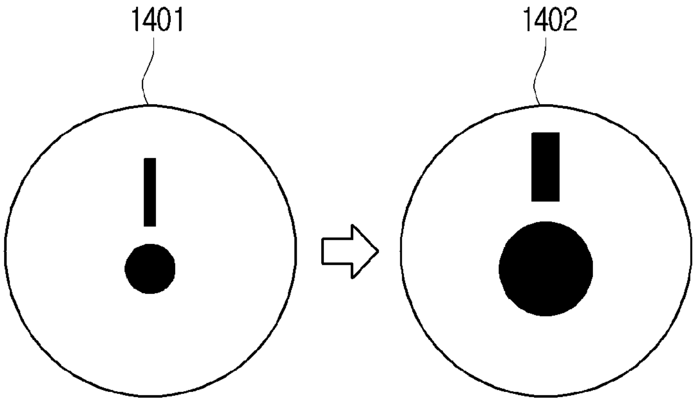

FIGS. 12, 13 and 14 are diagrams illustrating a lens array according to one or more embodiments of the disclosure.

The electronic apparatus 100 may include the contact portion 110, the camera 120, an enclosure 1210 for receiving the contact portion 110 and the camera 120, and a lens array 1220 as shown in FIG. 12. In FIG. 12, the processor 130 has been omitted for convenience of description.

The contact portion 110 may include a gel 110-1, a plurality of markers 110-2 printed at one surface of the gel 110-1, and a coating layer 110-3 formed at an upper end of the plurality of markers 110-2.

The lens array 1220 may be formed at an opposite surface of the gel 110-1, and include a plurality of lenses that correspond to each of the markers 110-2. For example, the lens array 1220 may include, as shown in FIG. 13, a plurality of lenses 1310-1, 1310-2, . . . 1310-N that correspond to each of the markers 110-2. The plurality of lenses 1310-1, 1310-2, . . . 1310-N may enlarge the plurality of markers 110-2, respectively (i.e., the plurality of lenses may be used to generate images that enlarge the plurality of markers).

The processor 130 may identify the size change of each of the markers 110-2 through each of the lenses, and identify the force in the direction perpendicular to the contact portion 110 based on the identified size change. For example, the processor 130 may identify, as shown in FIG. 14, the size of each of the markers 110-2 from a less enlarged state shown in 1401 to a more enlarged state shown in 1402 through each of the lenses, and accordingly, the size change of each of the markers 110-2 may be identified more accurately.

Alternatively, through a structure as described, the plurality of markers 110-2 may be implemented in a reduced size. In this case, there is an effect of durability of the contact portion 110 increasing. Alternatively, through the structure as described, manufacturing costs may be reduced by lowering a resolution of the camera 120.

Figure 15:
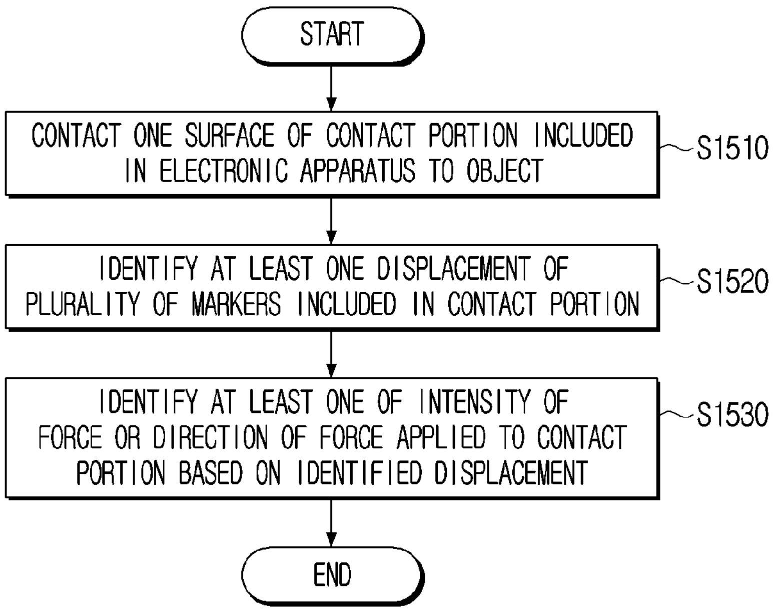
FIG. 15 is a flowchart illustrating a control method of an electronic apparatus according to one or more embodiments of the disclosure.

FIG. 15 is a flowchart illustrating a control method of an electronic apparatus according to one or more embodiments of the disclosure.

One surface of the contact portion included in the electronic apparatus may contact an object in operation 51510. The displacement of at least one of the plurality of markers included in the contact portion may be identified in operation S1520. The displacement may be identified based on a first image of the opposite surface of the contact portion that is captured through the camera included in the electronic apparatus. At least one of the intensity of the force applied to the contact portion or the direction of the force may be identified based on the identified displacement in operation S1530. The first marker of the plurality of markers may be such that at least one of the form or color is different from the second marker which is adjacent to the first marker.

Each of the markers may include the pattern of the first form and the pattern of the second form provided at one side of the pattern of the first form, and the identifying at least one of the intensity of the force or the direction of the force (operation S1530) may include identifying at least one of the intensity of the force or the direction of the force based on the pattern of the first form and the pattern of the second form.

Further, the pattern of the first form may be the circular pattern, and the pattern of the second form may be the linear pattern.

The identifying at least one of the intensity of the force or the direction of the force (operation S1530) may include identifying, based on the circular pattern, a rotational force parallel to the contact portion based on the displacement of the linear pattern.

In addition, adjacent patterns of the second form may vary in color.

The first marker may include a circular first pattern and a linear first pattern oriented from the circular first pattern toward a first direction, the second marker may be adjacent to the first marker in a direction that is opposite the first direction, the second marker including a circular second pattern and a linear second pattern oriented from the circular second pattern toward a second direction that is perpendicular to the first direction, the plurality of markers may include a third marker and a fourth marker, the third marker may be adjacent to the second marker in a direction that is opposite the second direction, the third marker including a circular third pattern and a linear third pattern oriented from the circular third pattern toward a third direction that is perpendicular to the second direction, and the fourth marker may be adjacent to the third marker in direction that is opposite to the third direction, the fourth marker including a circular fourth pattern and a linear fourth pattern oriented from the circular fourth pattern toward a fourth direction that is perpendicular to the third direction.

In addition, the electronic apparatus may further include a lens array which is formed at the opposite surface of the contact portion and includes the plurality of lenses that correspond to each of the markers. The identifying at least one of the intensity of the force or the direction of the force (operation S1530) may include identifying the size change of each of the markers through each of the lenses, and identifying force in the direction perpendicular to the contact portion based on the identified size change.

Each of the markers may include the pattern of the first form, or include the pattern of the first form and at least one pattern of the second form provided adjacent to the pattern of the first form.

In addition, the identifying the displacement (operation S1520) may include identifying at least one displacement of the plurality of markers based on the first image and the second image in which the opposite surface of the contact portion is captured through the camera prior to a surface of the contact portion contacting the object.

The contact portion may include the transparent gel, the plurality of markers may be printed at one surface of the gel, and the coating layer formed at the upper end of the plurality of markers.

According to the various embodiments of the disclosure as described above, the electronic apparatus may identify various directions of the force using the contact portion that includes the plurality of markers implemented in various forms and colors, and reduce sensing error even if the displacement is somewhat bigger.

In addition, the electronic apparatus may include the lens array and identify the force perpendicular to the contact portion more accurately.

According to one or more embodiments of the disclosure, the various embodiments described above may be implemented with software including instructions stored in a machine-readable storage media (e.g., computer). The machine may call an instruction stored in the storage medium, and as a device operable according to the called instruction, may include an electronic apparatus according to the above-mentioned embodiments. Based on an instruction being executed by the processor, the processor may directly or using other elements under the control of the processor perform a function corresponding to the instruction. The instruction may include a code generated by a compiler or executed by an interpreter. The machine-readable storage medium may be provided in the form of a non-transitory storage medium. Herein, 'non-transitory' merely may mean that the storage medium is tangible and does not include a signal, and the term does not differentiate data being semi-permanently stored or being temporarily stored in the storage medium.

According to one or more embodiments, a method according to the various embodiments described above may be provided included a computer program product. The computer program product may be exchanged between a seller and a purchaser as a commodity. The computer program product may be distributed in the form of a machine-readable storage medium (e.g., a compact disc read only memory (CD-ROM)), or distributed online through an application store (e.g., PLAYSTORE™). In the case of online distribution, at least a portion of the computer program product (e.g., downloadable app) may be stored at least temporarily in the storage medium such as a server of a manufacturer, a server of an application store, or a memory of a relay server, or temporarily generated.

According to one or more embodiments of the disclosure, the various embodiments described above may be implemented in a recordable medium which is readable by a computer or a device similar to the computer using software, hardware, or the combination of software and hardware. In some cases, embodiments described herein may be implemented by the processor itself. According to a software implementation, embodiments such as the procedures and functions described herein may be implemented with a separate software. The respective software may perform one or more functions and operations described herein.

The computer instructions for performing processing operations in a device according to the various embodiments described above may be stored in a non-transitory computer-readable medium. The computer instructions stored in this non-transitory computer-readable medium may cause a specific device to perform a processing operation from a device according to the above-described various embodiments when executed by a processor of the specific device. The non-transitory computer readable medium may refer to a medium that stores data semi-permanently rather than storing data for a very short time, such as a register, a cache, a memory, or the like, and is readable by a device. Specific examples of the non-transitory computer readable medium may include, for example, and without limitation, a compact disc (CD), a digital versatile disc (DVD), a hard disc, a Blu-ray disc, a USB, a memory card, a ROM, and the like.

In addition, respective elements (e.g., a module or a program) according to various embodiments described above may be formed of a single entity or a plurality of entities, and some sub-elements of the above-mentioned sub-elements may be omitted or other sub-elements may be further included in the various embodiments. Alternatively or additionally, some elements (e.g., modules or programs) may be integrated into one entity to perform the same or similar functions performed by the respective corresponding elements prior to integration. Operations performed by a module, a program, or other element, in accordance with the various embodiments, may be executed sequentially, in parallel, repetitively, or in a heuristically manner, or at least some operations may be performed in a different order, omitted, or a different operation may be added.

The embodiments of the disclosure disclosed in the specification and the drawings provide merely specific examples to easily describe technical content according to the embodiments of the disclosure and help the understanding of the embodiments of the disclosure, not intended to limit the scope of the embodiments of the disclosure. Accordingly, the scope of various embodiments of the disclosure should be interpreted as encompassing all modifications or variations derived based on the technical spirit of various embodiments of the disclosure in addition to the embodiments disclosed herein.

What is claimed is:

1. An electronic apparatus comprising:

a contact portion comprising a plurality of markers;

a camera; and at least one processor configured to:

identify, based on at least one surface of the contact portion contacting an object, at least one displacement of the plurality of markers based on a first image in which a first surface of the contact portion that is opposite to the at least one surface is captured by the camera, and identify, based on the at least one displacement, at least one of an intensity of a force applied to the contact portion and a direction of the force applied to the contact portion, wherein a first marker of the plurality of markers comprises at least one of a form and a color that is different from a second marker of the plurality of markers that is adjacent to the first marker, wherein each of the plurality of markers comprises at least one first pattern that is circular and at least one second pattern that is linear and that is provided at one side of the at least one first pattern.

2. The electronic apparatus of claim 1, wherein the at least one processor is further configured to identify a rotational force that is parallel to the contact portion based on the first displacement of the at least one second pattern.

3. The electronic apparatus of claim 1, wherein the at least one second pattern comprises a plurality of second patterns, and wherein adjacent patterns of the plurality of second patterns vary in color.

4. The electronic apparatus of claim 1, wherein the first marker comprises a circular first pattern and a linear first pattern oriented from the circular first pattern toward a first direction, wherein the second marker is adjacent to the first marker in a direction that is opposite the first direction, and the second marker comprises a circular second pattern and a linear second pattern oriented from the circular second pattern toward a second direction that is perpendicular to the first direction, wherein the plurality of markers further comprises a third marker and a fourth marker, wherein the third marker is adjacent to the second marker in a direction that is opposite the second direction, and the third marker comprises a circular third pattern and a linear third pattern oriented from the circular third pattern toward a third direction that is perpendicular to the second direction, and wherein the fourth marker is adjacent to the third marker in direction that is opposite to the third direction, and the fourth marker comprises a circular fourth pattern and a linear fourth pattern oriented from the circular fourth pattern toward a fourth direction that is perpendicular to the third direction.

5. The electronic apparatus of claim 1, further comprising:

a lens array provided at an opposite surface of the contact portion, the lens array comprising a plurality of lenses corresponding to the plurality of markers, wherein the at least one processor is further configured to:

identify a size change of each of the plurality of markers through each of the plurality of lenses, and identify a force in a direction perpendicular to the contact portion based on the identified size change.

6. The electronic apparatus of claim 1, further comprising:

a memory configured to store a second image in which a surface of the contact portion is captured through the camera prior to the contact portion contacting the object, wherein the at least one processor is further configured to identify the at least one displacement based on the first image and the second image.

7. The electronic apparatus of claim 1, wherein the contact portion comprises:

a transparent gel; and a coating layer formed at an upper end of the plurality of markers, and wherein the plurality of markers are provided at one surface of the transparent gel.

8. A control method of an electronic apparatus, the control method comprising:

contacting at least one surface of a contact portion of the electronic apparatus to an object;

identifying, based on a first image in which a first surface of the contact portion that is opposite to the at least one surface is captured by a camera of the electronic apparatus, at least one displacement of a plurality of markers provided in the contact portion; and identifying, based on the identified at least one displacement, at least one an intensity of a force applied to the contact portion and a direction of the force applied to the contact portion, wherein a first marker of the plurality of markers comprises at least one of a form and a color that is different from a second marker of the plurality of markers that is adjacent to the first marker, wherein each of the plurality of markers comprises at least one first pattern that is circular and at least one second pattern that is linear and that is provided at one side of the at least one first pattern.

9. The control method of claim 8, wherein the identifying the at least one of the intensity of the force and the direction of the force comprises:

identifying, based on the at least one first pattern, a rotational force that is parallel to the contact portion based on the first displacement of the at least one second pattern.

10. The control method of claim 8, wherein the at least one second pattern comprises a plurality of second patterns, and wherein adjacent patterns of the plurality of second patterns vary in color.

11. A non-transitory computer-readable storage medium storing instructions that, when executed by at least one processor, cause the at least one processor to:

identify, based on at least one surface of a contact portion of an electronic apparatus contacting an object, at least one displacement of a plurality of markers of the contact portion based on a first image in which a first surface of the contact portion that is opposite to the at least one surface is captured by a camera of the electronic apparatus, and identify, based on the at least one displacement, at least one of an intensity of a force applied to the contact portion and a direction of the force applied to the contact portion, wherein a first marker of the plurality of markers comprises at least one of a form and a color that is different from a second marker of the plurality of markers that is adjacent to the first marker, wherein each of the plurality of markers comprises at least one first pattern that is circular and at least one second pattern that is linear and that is provided at one side of the at least one first pattern.

12. The storage medium of claim 11, wherein the instructions, when executed, further cause the at least one processor to identify a rotational force that is parallel to the contact portion based on the first displacement of the at least one second pattern.

13. The storage medium of claim 11, wherein the at least one second pattern comprises a plurality of second patterns, and wherein adjacent patterns of the plurality of second patterns vary in color.

14. The electronic apparatus of claim 1, wherein the at least one displacement comprises a first displacement of the at least one second pattern with respect to the at least one first pattern.

15. The control method of claim 8, wherein the at least one displacement comprises a first displacement of the at least one second pattern with respect to the at least one first pattern.

16. The storage medium of claim 11, wherein the at least one displacement comprises a first displacement of the at least one second pattern with respect to the at least one first pattern.

* * * * *